United States Patent [19]

Nicholas

[11] Patent Number: 4,922,206
[45] Date of Patent: May 1, 1990

[54] METHOD OF DEMODULATION USING SPLIT DELAY LINE

[75] Inventor: David C. Nicholas, Cedar Rapids, Iowa

[73] Assignee: Rockwell International Corporation, El Segundo, Calif.

[21] Appl. No.: 373,833

[22] Filed: Jun. 28, 1989

[51] Int. Cl.⁵ .......................................... H04L 27/22
[52] U.S. Cl. .................................. 329/304; 329/336; 375/80; 375/84
[58] Field of Search ............... 329/300, 301, 303, 304, 329/305, 310, 336, 337; 375/80, 83, 84

[56] References Cited

U.S. PATENT DOCUMENTS

| | | | |
|---|---|---|---|
| 4,317,210 | 2/1982 | Dekker et al. | 375/76 |
| 4,567,442 | 1/1986 | Haussmann | 329/145 |
| 4,674,105 | 6/1987 | Suzuki | 375/80 |
| 4,737,729 | 4/1988 | Haussmann | 329/145 |
| 4,746,872 | 5/1988 | Yamagata | 329/310 |

OTHER PUBLICATIONS

M. Simon and D. Divsalar, "Open Loop Frequency Synchronization of MDPSK with Doppler", 1987 IEEE/ICC Proceedings, 7.7.1–7.7.7.

D. Divsalar and M. Simon, "MSAT-X Doppler-Corrected Differential Detection" MSAT-X Quarterly, No. 17, Oct. 1988, pp. 14–19.

Primary Examiner—Siegfried H. Grimm
Attorney, Agent, or Firm—John C. McFarren; M. Lee Murrah; H. Fredrick Hamann

[57] ABSTRACT

A method is disclosed for demodulating binary differential phase shift keyed signals in the presence of carrier frequency uncertainties. In phase modulation, a data signal is impressed on a carrier frequency to produce a modulated signal. The modulated signal and a corresponding quadrature signal are input to a split delay line, wherein each half of the delay line provides a delay of one-half the data signal bit period. The modulated and the delayed signals are input to a summing junction to provide a combined output independent of the carrier frequency. Thus, the method of demodulation is insensitive to Doppler shifts and other carrier frequency offsets.

15 Claims, 2 Drawing Sheets

METHOD OF DEMODULATION USING SPLIT DELAY LINE

TECHNICAL FIELD

The present invention relates to demodulation of binary differential phase shift keyed signals and, more particularly, to a method of demodulation using a split delay line to extract data independent of carrier frequency.

BACKGROUND OF THE INVENTION

In traditional phase modulation, a data signal $\phi(t)$ is impressed on a carrier wave of frequency $f_c$ to produce a modulated signal $$\cos(2\pi f_c t + \phi(t)),$$

where $\phi(t)$ is a baseband data signal of bit period $\tau$. $\phi(t)$ in turn carries the data differentially encoded in which, for example, a phase change in $\phi(t)$ represents a logic 1 and no phase change represents a logic 0. In binary phase modulation, for example, $\phi(t)$ has two values, 0 and $\pi$.

In the conventional method of differential demodulation, a delay of $\tau$ is used to demodulate the modulated signal. Generally, the quadrature data signal $$\sin(2\pi f_c t + \phi(t))$$

is produced so that an arctangent ($\tan^{-1}$) operation can be performed. The production and use of corresponding sine and cosine signals in radio frequency receivers is well known in the prior art. This is generally accomplished by injecting both the sine and cosine of an intermediate frequency (IF) into a pair of IF stages at the last stage of an IF down-conversion chain.

As illustrated in FIG. 1, the arctangent operation 12 yields the argument of the sine and cosine functions. The argument is applied to a delay line 14, the output of which is obtained with the argument at a summing junction 16. This operation yields the term $$2\pi f_c t - 2\pi f_c (t-\tau) + \phi(t) - \phi(t-\tau)$$

as shown in FIG. 1. Because the desired data signal is $$\cos(\phi(t) - \phi(t-\tau)),$$

it would be convenient if the term $$2\pi f_c t - 2\pi f_c (t-\tau) = 2\pi f_c \tau$$

contributed nothing to the result output by cosine operator 18. This term can be rewritten as $$2\pi f_c / f_d, \text{ where } f_d = 1/\tau \text{ is the data frequency.}$$

If the carrier frequency is chosen as $f_c = n f_d$, where n is a positive integer, the output of the cosine operator 18 of FIG. 1, $$\cos(2\pi f_c t - 2\pi f_c (t-\tau) + \phi(t) - \phi(t-\tau)),$$

becomes $$\cos(2\pi f_c \tau + \phi(t) - \phi(t-\tau)) = \cos(\phi(t) - \phi(t-\tau))$$

because $$2\pi f_c \tau = 2\pi f_c / f_d,$$

which simplifies to $$2\pi n, \text{ when } f_c = n f_d.$$

The exact result of the foregoing operations depends on the amount of phase modulation. In binary differentially encoded modulation, for example, if zero angle represents 0 and $\pi$ represents a 1, then no phase change (0 to 0 or $\pi$ to $\pi$) yields 0 and phase changes $\pi$ to 0 and 0 to $\pi$ yield $\pi$ and $-\pi$, respectively. As indicated in FIG. 1, cosine operator 18 is used to output $\cos(0)=1$, or $\cos(\pi \text{ or } -\pi) = -1$. In this example, $+1$ can represent logic 1 and $-1$ can represent logic 0.

A limitation of prior art demodulators is that if, for some reason, $f_c$ is not, or cannot be chosen to be, equal to $nf_d$, then the demodulation fails. For example, if the carrier frequency $f_c = (n+\frac{1}{2})f_d$, then an angle of $\pi$ is introduced and the data are simply reversed. This result is satisfactory if it is planned. However, if $f_c = (n+\frac{1}{4})f_d$, then an angle of $\pi/2$ is introduced and the data are lost, because $\cos(2n\pi + \pi/2) = 0$.

For baseband systems, $f_c$ can be chosen carefully and held precisely, at least in practical terms. In RF systems, $f_c$ is the original RF carrier frequency that is converted down through a series of IF stages. As explained above, the total of the resulting $f_c$ uncertainty must be held to a fraction of $f_d/4$. This is generally not a problem at HF with relatively high data rates, for example. However, $f_c$ cannot always be chosen with sufficient precision in some data transmission systems.

In mobile satellite communication systems, for example, where L-band carriers in the vicinity of $10^9$ Hz are used with low data rates, Doppler shift alone exceeds 100 Hz even for relatively slow moving land vehicles, yet the available power may only support data rates of 50 to 100 Hz. In this type of system, $f_c$ errors pose a significant problem. Thus, there is a need for a method of demodulation that can extract the data signals independent of the carrier frequency so that data is not lost as a result of carrier frequency shifts and uncertainty.

SUMMARY OF THE INVENTION

The present invention comprises a method of demodulating a binary differential phase shift key signal. The input signal comprises a phase modulated cosine wave having a carrier frequency component and a data signal component. In the preferred embodiment, an arctangent operation is applied to the modulated cosine wave signal and to a corresponding quadrature sine wave signal to yield the argument of the trigonometric functions. The argument is then input to a split delay line. Each segment of the delay line provides a delay of one-half the data signal bit period. The center tap of the delay line is coupled to a times-two multiplier. The output of the multiplier is applied as a positive input to a summing junction. The argument and the final output of the delay line are both applied as negative inputs to the summing junction. The output of the summing junction is connected to a cosine operator that outputs a $+1$ or a $-1$, indicating a 1 or 0 logic level, respectively. By splitting the delay line and combining the outputs as indicated above, the cosine operator outputs the data signal logic levels independent of the carrier frequency. Thus, it is not necessary to choose or to be able to choose the carrier frequency $f_c$ to be an integer multiple of the data frequency $f_d$. As a result, demodulation of the binary differential phase shift keyed signal is not affected by carrier frequency uncertainty caused by Doppler shifts and other carrier frequency offsets.

BRIEF DESCRIPTION OF THE DRAWINGS

For a more complete understanding of the present invention and for further advantages thereof, referece is made to the following Description of the Preferred Embodiment taken in conjunction with the accompanying Drawings, in which.

DESCRIPTION OF THE PREFERRED EMBODIMENT

In one embodiment of the present invention, a high frequency carrier with data is down-converted in a dual IF stage with both sine and cosine components of an injection frequency. The resulting in-phase (I) and quadrature (Q) signals, after low-pass filtering to eliminate the high frequency terms, are:

$$I = \cos(\omega t + \phi(t)) \text{ and}$$

$$Q = \sin(\omega t + \phi(t)),$$

where $\omega$ is a convenient intermediate carrier frequency which could be nominally zero, if desired. Any frequency uncertainty in the original high frequency carrier is present in $\omega$.

Figure 2A:
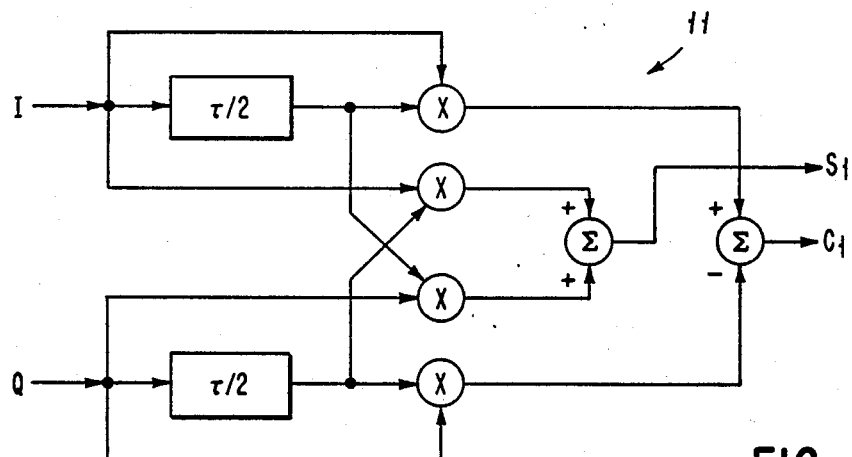
FIG. 2A is a block diagram of a half unit dot/cross product mixer of the present invention.
Figure 2B:
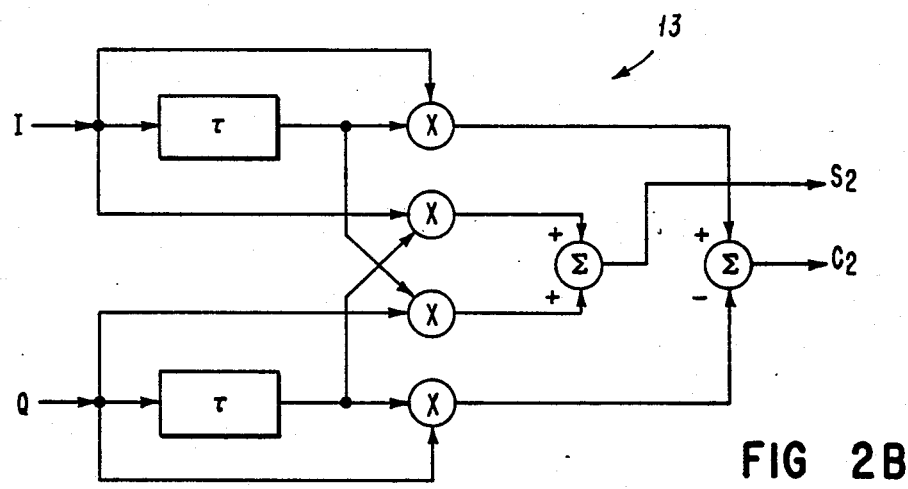
FIG. 2B is a block diagram of a full unit dot/cross product mixer of the present invention.

Referring to FIGS. 2A and 2B, dot/cross product mixers 11 and 13, respectively, form the following components:

$$S_1 = \sin(\omega \tau/2 + \phi(t) - \phi(t - \tau/2))$$

$$C_1 = \cos(\omega \tau/2 + \phi(t) - \phi(t - \tau/2))$$

$$S_2 = \sin(\omega \tau + \phi(t) - \phi(t - \tau))$$

$$C_2 = \cos(\omega \tau + \phi(t) - \phi(t - \tau)).$$

The advantage of using dot/cross product mixers 11 and 13 is that the double frequency terms cancel in each case and no filtering is required. As would be appreciated by one having skill in the art, mixers 11 and 13 could be combined into one mixer having a pair of delay lines of delay $\tau$, with each delay line having a center tap.

Figure 2C:
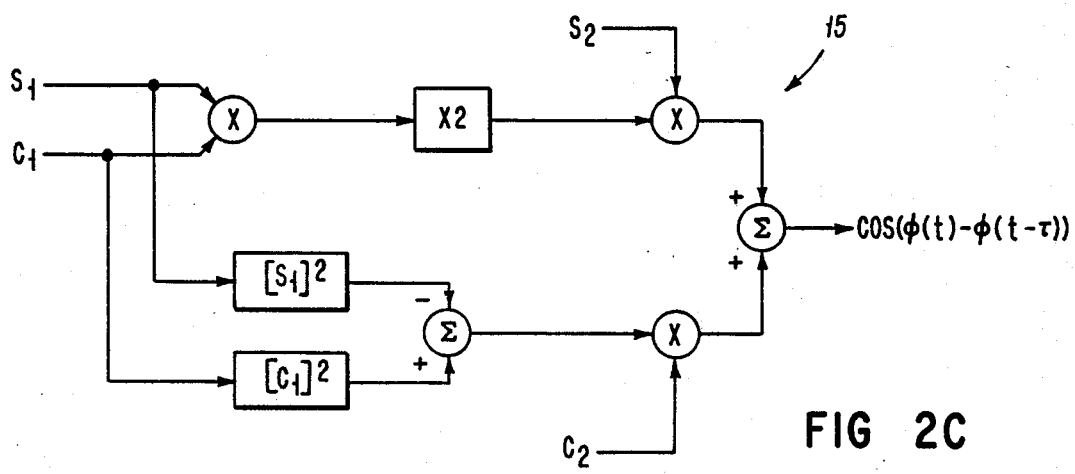
FIG. 2C is a block diagram of a combiner circuit of the present invention.

Referring to FIG. 2C, components $S_1$ and $C_1$ from mixer 11 are processed by combiner circuit 15 and combined with components $S_2$ and $C_2$ from mixer 13. Cancellation of unwanted terms occurs in circuit 15 to yield the desired result $\cos(\phi(t) - \phi(t - \tau))$. This result is explained further in conjunction with the preferred embodiment described below.

In the preferred embodiment of the present invention, a data signal $\phi(t)$ is impressed on a carrier of frequency $f_c$ to produce a modulated signal $$\cos(2\pi f_c t + \phi(t)),$$

where $\phi(t)$ is a baseband data signal having bit period $\tau$. $\phi(t)$ carries the data differentially encoded, in which a phase change in $\phi(t)$ represents a logic 1 and no phase change represents a logic 0. For binary phase modulation, $\phi(t)$ has two values, 0 and $\pi$.

Figure 1:
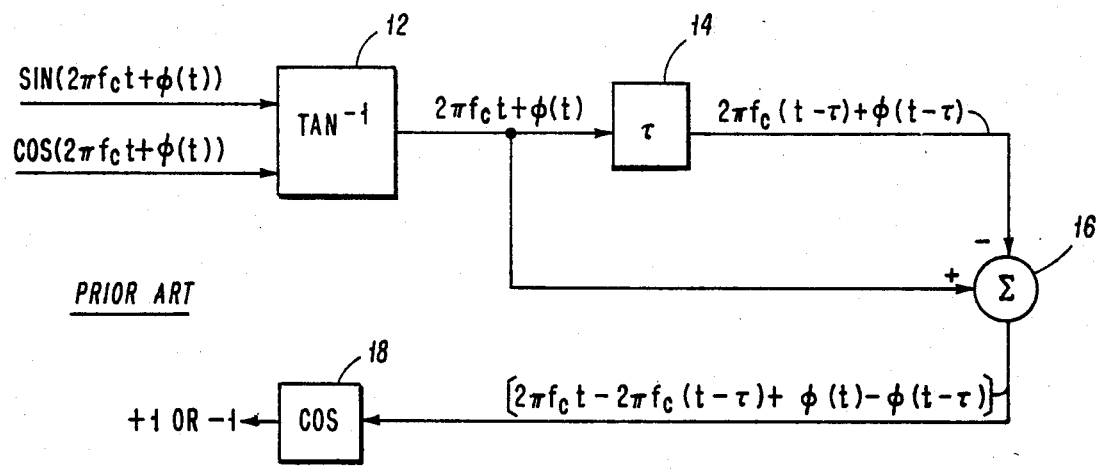
FIG. 1 is a block diagram of a prior art demodulator utilizing a single delay.
Figure 3:
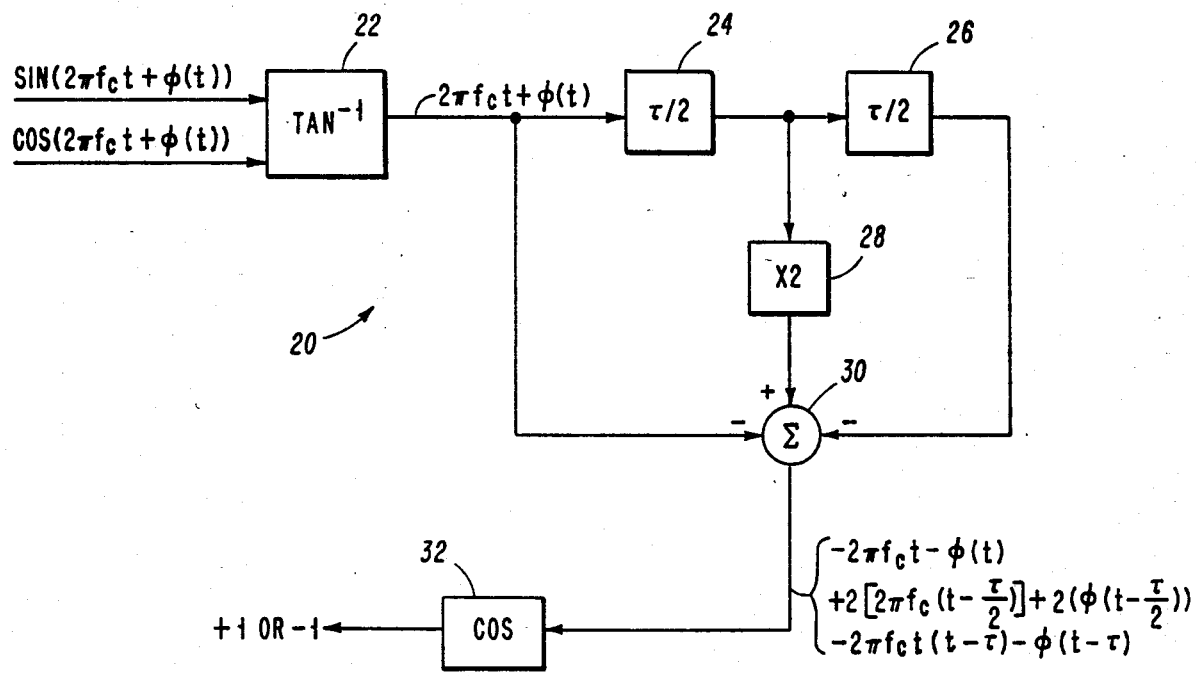
FIG. 3 is a block diagram of the preferred embodiment of the present invention utilizing an arctangent operation and a split delay line.

As illustrated in the block diagram of FIG. 3, the modulated signal and a corresponding quadrature signal $$\sin(2\pi f_c t + \phi(t)) \text{ and } \cos(2\pi f_c t + \phi(t))$$

are input to an arctangent ($\tan^{-1}$) operator 22 of a demodulator 20. Arctangent operator 22 outputs the argument, $2\pi f_c t + \phi(t)$, of the in-phase and quadrature signals. The argument is applied to a split delay line and also as a negative input to a summing junction 30. The split delay line comprises delay elements 24 and 26, each of which provides a delay of $\tau/2$. The output of delay element 24 is input to a times two multiplier 28, the output of which is applied as a positive input to summing junction 30. The output of delay element 24 is also input to delay element 26, the output of which is applied as a negative input to swimming junction 30. The output of summing junction 30 is the following:

$$-2\pi f_c t - \phi(t)$$

$$+ 2[2\pi f_c(t - \tau/2)] + 2\phi(t - \tau/2)$$

$$-2\pi f_c(t - \tau) - \phi(t - \tau).$$

The output of summing junction 30 can be separated into carrier terms and data terms that may be simplified. The carrier terms reduce to $$2\pi f_c[-t + 2t - 2(\tau/2) - t + \tau] = 0.$$

Thus, it can be seen that the output is independent of the carrier frequency $f_c$. The data terms $$-\phi(t) + 2(\phi(t - \tau/2)) - \phi(t - \tau)$$

also simplify to the desired result for square modulation in which $\phi(t)$ remains constant over the data bit period $\tau$. This can be shown as follows by considering separately the first and second halves of the data bit period.

For the first half of the bit period, when $$n\tau < t < n\tau + \tau/2,$$

where $n = 0, 1, 2 \ldots,$ $$\phi(t - \tau/2) = \phi(t - \tau),$$

so that $$-\phi(t) + 2(\phi(t - \tau/2)) - \phi(t - \tau)$$

becomes $$-\phi(t) + \phi(t - \tau).$$

For the second half of the bit period, when $$n\tau + \tau/2 < t < (n+1)\tau,$$

where $n = 0, 1, 2 \ldots,$ $$-\phi(t) = \phi(t - \tau/2).$$

so that $$-\phi(t)+2(\phi(t-\tau/2))-\phi(t-\tau)$$

becomes $$\phi(t)-\phi(t-\tau).$$

However, because $$\cos(-\phi(t)+\phi(t-\tau))=\cos(\phi(t)-\phi(t-\tau)),$$

it can be seen that the output of cosine operator 32 remains constant over the data bit period $\tau$. In actual operation there may be a short transient at mid-bit as the change between the two terms occurs. This transient is readily filtered out, however, in the normal detection process following demodulation.

The method of the present invention may be utilized by a receiver for demodulating signals having large carrier frequency uncertainty where rapid acquisition of data is required. In data transmission systems, such as mobile satellite communication systems and microwave landing systems, low data rates at high carrier frequencies product significant relative carrier frequency uncertainty, and Doppler shifts due to vehicle motion add to the carrier frequency uncertainty. Although the noise performance of the present invention is somewhat worse than ordinary differential demodulation, the use of a split delay line provices rapid acquisition of data independent of the carrier frequency.

Although the present invention has been described with respect to a specific embodiment thereof, various changes and modifications, such as the use of analog elements or digital signal processing elements operating at an appropriate sampling rate, may be suggested to one skilled in the art. Thus, it is intended that the present invention encompass such changes and modifications as fall within the scope of the appended claims.

I claim:

1. A method of demodulation, comprising the steps of:
    providing a modulated signal having a carrier component and a data component;
    inputting said modulated signal to a delay element;
    generating first and second delayed signals; and
    combining said delayed signals and said modulated signal to produce a combined output comprising a function of said data component independent of said carrier component.

2. The method of claim 1, wherein the step of inputting said modulated signal comprises inputting said modulated signal to first and second delay elements.

3. The method of claim 1, wherein the steps of inputting said modulated signal and generating first and second delayed signals comprise:
    inputting said modulated signal to a first delay element to generate said first delayed signal; and
    inputting said first delayed signal to a second delay element to generate said second delayed signal.

4. The method of claim 1, wherein the step of combining further comprises the steps of:
    providing said modulated signal as a negative input to a summing junction;
    doubling said first delayed signal;
    providing said doubled first delayed signal as a positive input to said summing junction; and
    providing said second delayed signal as a negative input to said summing junction.

5. The method of claim 1, wherein the step of providing said modulated signal comprises providing an in-phase modulated signal and a quadrature modulated signal.

6. The method of claim 5, further comprising the step of generating an arctangent of said in-phase and quadrature signals prior to inputting said modulated signals to said delay element.

7. The method of claim 1, further comprising the step of generating a cosine of said combined output to extract logic levels of said data component.

8. A method of demodulating binary differential phase shift keyed signals, comprising the steps of:
    inputting modulated in-phase and quadrature signals to a demodulator, said signals comprising a carrier frequency component and a data component having a data bit period;
    generating first and second delayed signals;
    combining said modulated and said delayed signals to produce a combined output comprising a function of said data component independent of said carrier frequency component.

9. The component of claim 8, further comprising the steps of generating an argument of said modulated in-phase and quadrature signals.

10. The method of claim 9, wherein the steps of generating and combining said delayed signals comprise:
    inputting said argument to a delay element to generate said first and second delayed signals; and
    combining said argument and said delayed signals to produce said combined output.

11. The method of claim 10, wherein the step of combining further comprises the steps of:
    providing said argument as a negative input to a summing junction;
    doubling said first delayed signal and providing said doubled first delayed signal as a positive input to said summing junction; and
    providing said second delayed signal as a negative input to said summing junction.

12. The method of claim 11, wherein said step of generating an argument comprises generating an arctangent of said in-phase and quadrature signals.

13. The method of claim 12, further comprising the step of generating a cosine of said combined output to extract logic levels of said data component.

14. A method of demodulating binary differential phase shift keyed signals, comprising the steps of:
    inputting modulated in-phase and quadrature signals to a demodulator, said signals comprising a carrier frequency component and a data component having a data bit period;
    generating an arctangent of said signals to produce an argument of said signals;
    providing said argument as a negative input to a summing junction;
    providing said argument to a first delay element having a first delayed output with a first delay of one-half said data bit period;
    doubling said first delayed output and providing said doubled first delayed output as a positive input to said summing junction;
    providing said first delayed output to a second delay element having a second delayed output with a second delay of one-half said data bit period;

providing said second delayed output as a negative input to said summing junction; and generating a combined output from said summing junction, said combined output comprising a function of said data component independent of said carrier frequency component.

15. The method of claim 14, further comprising the step of generating a cosine of said combined output to extract logic levels of said data component.

* * * * *